United States Patent
Schilit et al.

(10) Patent No.: US 6,356,922 B1
(45) Date of Patent: *Mar. 12, 2002

(54) METHOD AND SYSTEM FOR SUGGESTING RELATED DOCUMENTS

(75) Inventors: William N Schilit, Menlo Park; Morgan N. Price, Palo Alto; Gene Golovchinsky, Palo Alto; Mark D. Weiser, Palo Alto, all of CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/100,041

(22) Filed: Jun. 19, 1998

Related U.S. Application Data

(63) Continuation-in-part of application No. 08/929,426, filed on Sep. 15, 1997.

(51) Int. Cl.⁷ .............................................. G06F 17/21
(52) U.S. Cl. ............................ 707/512; 707/3; 707/513
(58) Field of Search ................................ 707/512, 501, 707/513, 1–46, 102; 345/338, 760

(56) References Cited

U.S. PATENT DOCUMENTS

| | | | |
|---|---|---|---|
| 5,341,293 A | * | 8/1994 | Vertenlney et al. ......... 707/530 |
| 5,398,310 A | * | 3/1995 | Tchao et al. ................. 707/541 |

(List continued on next page.)

OTHER PUBLICATIONS

Lowder, Jason et al, "Wide area selection as a hyperdocument search interface", School of Computer Science and Software Engineering, Monash Univ., Melbourne Australia, <http://www7.scu.edu.au/programme/posters/1854/com1854.htm>.*

M. Agosti et al., "On the Use of Information Retrieval Techniques for the Automatic Construction of Hypertext, "Information Processing & Management, vol. 33, No. 2, pp. 133–144, 1997.

G. Golovchinsky, "What the Query Told the Link: The Integration of Hypertext and Information Retrieval, " Proceedings of the Eighth ACM International Hypertext Conference, Southampton, UK, Apr. 6–11, 1997, pp. 67–74.

"Automatic Hypermedia Link Generation," IBM Technical Disclosure Bulletin, vol. 35, No. 1A, Jun. 1992, pp. 447–448.

"A Trainable Document Summarizer", J. Kupiec et al., Proceedings of SIGIR '95, Jul. 1995, Pittsburgh, PA, ACM Press.

(List continued on next page.)

*Primary Examiner*—Joseph H. Feild
(74) *Attorney, Agent, or Firm*—Oliff & Berridge, PLC

(57) ABSTRACT

The method and system of this invention analyzes a document to generate margin or end notes of references to portions of other documents and other portions of the same documents that relate to annotated passages in the document or to the entire document. The method and system of the invention is responsive to the annotation of a passage of a document to generate a query that retrieves portions of documents that have similar content to the annotated passage. The retrieved portions are made available to the reader through selectable links placed in the margin near the annotated passage in a display of the document. Additionally, the method and system of the invention provides end notes with links to portions that are similar in content to the overall content of the annotated document. The method and system of the invention assists the reader by passively generating selectable links to related portions to assist the user in relating the new document to other portions of documents.

31 Claims, 5 Drawing Sheets

U.S. PATENT DOCUMENTS

| | | | | | |
|---|---|---|---|---|---|
| 5,404,295 | A | * | 4/1995 | Katz et al. | 707/2 |
| 5,550,965 | A | * | 8/1996 | Gagge et al. | 707/512 |
| 5,596,700 | A | * | 1/1997 | Darnell et al. | 345/340 |
| 5,675,710 | A | * | 10/1997 | Lewis | 706/12 |
| 5,748,805 | A | * | 5/1998 | Withgott et al. | 382/306 |
| 5,774,109 | A | * | 6/1998 | Winksy et al. | 345/124 |
| 5,806,079 | A | * | 9/1998 | Rivette et al. | 707/512 |
| 5,822,539 | A | * | 10/1998 | Van Hoff | 709/236 |
| 5,870,770 | A | * | 2/1999 | Wolfe | 707/501 |
| 5,873,107 | A | * | 2/1999 | Borovoy et al. | 707/501 |
| 5,893,126 | A | * | 4/1999 | Drews et al. | 707/512 |
| 5,911,145 | A | * | 6/1999 | Arora et al. | 707/514 |
| 5,960,448 | A | * | 9/1999 | Reichek et al. | 707/526 |
| 5,970,483 | A | * | 10/1999 | Evans | 707/3 |
| 6,122,647 | A | * | 9/2000 | Horowitz et al. | 707/513 |
| 6,182,091 | B1 | * | 1/2001 | Pitkow et al. | 707/501 |

OTHER PUBLICATIONS

"The Transformation, Analysis, and Retrieval of Information by Computer", Gerard Salton, *Automatic Text Processing*, 1989, Addison–Wesley Publishing Co., Inc.

"Effective View Navigation", George W. Furnas, *CHI 97 Electronic Publications: Papers*, 1997, ACM.

"User Interface Design for the Hyperties Electronic Encyclopedia", Shneiderman, Proceedings of Hypertext '87, Nov. 1987, Chapel Hill, NC.

"Programmable Browsing Semantics in Trellis", R. Furuta et al. Proceedings of Hypertext '89, Nov. 1989, Pittsburgh, PA, ACM Press.

"Hienet: A User–Centered Approach for Automatic Link Generation", D.T. Chang, Proceedings of Hypertext '93, Nov. 1993, Seattle, WA, ACM Press.

"Queries? Links? Is There A Difference?", G. Golovinsky, Proceedings of CHI '97, Mar. 1997, Atlanta, GA, ACM Press.

"What the Query Told the Link: The Integration of Hypertext and Information Retrieval", G. Golovinsky, Proceedings of Hypertext '97, Apr. 1997, Southhampton, UK, ACM Press.

"A Continuously Running Automatic Information Retrieval System", B.J. Rhodes et al. Proceedings of The First International Conference on the Practical Application of Intelligent Agents in Multi–Agent Technology, PAAM '96, Apr., 1997, London, UK.

"Queries–R–Links: Graphical Markup for Text Navigation", by G. Golovchinsky et al., Proceedings of INTERCHI '93, Apr. 1993, Amsterdam, The Netherlands, ACM Press.

"Reexamining the Cluster Hypothesis: Scatter/Gather on Retrieval Results", M.A. Hearst et al., Proceedings of ACM SIGIR '96, Aug. 1996, Zurich, Switzerland.

* cited by examiner has been demonstrated [28], it still relies on hierarchical structure of each document to support local navigation. SuperBook has been shown to be an effective interface for IR tasks when browsing structured collections [12], but alternatives to the book metaphor must be found to support browsing through loosely-structured hypertext collections.

One such alternative — the newspaper metaphor — is discussed in the following section, and VOIR, a prototype that implements it, is described. Some experimental results from an evaluation of VOIR are presented, and the paper concludes with a discussion of possible extensions and applications of this query-mediated hypertext interfaces.

2 VOIR

This section describes VOIR (Visualization of Information Retrieval), a prototype newspaper-based dynamic hypertext interface. The section first introduces the newspaper metaphor and discusses its implementation in VOIR. A description of VOIR's linking interface follows, and the discussion concludes with an overview of VOIR's visualization features.

Info Via Paper

FIG. 2

5 CONCLUSIONS

This paper describes VOIR, a query-mediated hypertext interface designed to support information exploration tasks in very large text databases. It describes a technique for mediating links with passage-based relevance feedback queries. Experimental results indicate that link-based queries produced better performance than passage selections, and that subjects found dynamic hypertext interfaces intuitive to use. This research suggests that integrating hypertext interfaces with full-text search engines can produce effective solutions for a class of information exploration tasks.

This work also has implications for models of information exploration (e.g., [37]) that posit a distinction between selecting anchors and forming queries. Interfaces such as the one described here suggest that the distinction between hypertext and information retrieval can become progressively blurred. As more sophisticated (e.g., agent-based) techniques are integrated into information exploration interfaces (e.g., [26]), some distinctions between semantic and statistical links should also disappear.

Related Documents

G. Golovchinsky, *Queries? Links? Is There a Difference?*, In Proceedings of CHI '97, (March 1997, Atlanta, GA), ACM Press.

FIG. 3

METHOD AND SYSTEM FOR SUGGESTING RELATED DOCUMENTS

This is a Continuation-in-Part of application Ser. No. 08/929,426 filed on Sep. 15, 1997. The entire disclosure of the prior application(s) is hereby incorporated by reference herein in its entirety.

BACKGROUND OF THE INVENTION

1. Field of Invention

This invention relates generally to electronic document reading systems. In particular, this invention is directed to an electronic document reading system that suggests other related documents when displaying a first document.

2. Description of Related Art

Retrieving documents similar to a document identified by the user as being related is known as relevance feedback. Relevance feedback is described in "Introduction to Modem Information Retrieval", G. Salton et al., McGraw Hill, (1983), incorporated herein by reference in its entirety. Interfaces that support relevance feedback conventionally require explicit action on the part of the reader and do not spontaneously offer suggestions of relevant documents. Information exploration interfaces designed for window-based computing environments typically present search results for other relevant documents via lists in a separate window or by replacing the visible document with the search results. These systems are very intrusive and interrupt the reading process.

Hypertext interfaces display links to documents relevant to a source document either by providing a margin that contains the links or by embedding the links in the text of the source document in the manner pioneered by "Hyperties." This system is described in "User Interface Design for the Hyperties Electronic Encyclopedia", by Shneiderman, *Proceedings of Hypertext '87*, November 1987, Chapel Hill, N.C. incorporated herein by reference in its entirety. However, these links are static and are created along with the source document by the hypertext author. Some systems, such as Trellis, display links dynamically, but only from a fixed set of previously-defined links. Trellis is described in "Programmable Browsing Semantics and Trellis", by R. Furuta et al. *Proceedings of Hypertext '89*, November 1989, Pittsburgh, Pa., ACM Press, incorporated herein by reference n its entirety.

The HieNet System uses inter-node similarity measures to create hypertext links based on links previously created by the hypertext author. This system is described in "Hienet: A User-Centered Approach for Automatic Link Generation", D. T. Chang, *Proceedings of Hypertext '93*, November 1993, Seattle, Wash., ACM Press, incorporated herein by reference in its entirety. When the author creates a link from a document A to a document B, the system automatically adds links from all documents similar to document A to all documents similar to document B. Anchors for these automatically-generated links are represented by icons in the margin of the various documents. Clicking on an icon displays a pop-up menu that contains a list of possible destination documents that are ranked by relevance to the query. Again, this system relies on links previously created by the author.

Other conventional systems relate to hypertext-like ways of displaying search results. HieNet displays automatic links in the margin, but anchors in the margin are not relevant to the content of the passage adjacent to the anchor. HieNet does not distinguish between document-document and passage-document links. Furthermore, HieNet does not indicate the number and nature of the documents reachable through the margin links.

Visualization of Information Retrieval System (hereinafter VOIR) is described in "Queries? Links? Is There a Difference?", *Proceedings of CHI '97*, G. Golovinsky, March 1997, Atlanta, Ga., ACM Press and in "What the Query Told the Link: The Integration of Hypertext and Information Retrieval", *Proceedings of Hypertext '97*, G. Golovinsky, April 1997, Southhampton, UK, ACM Press, each incorporated herein by reference in its entirety. VOIR is a mechanism that dynamically creates and resolves hypertext links with queries that are computed from the text surrounding a selected anchor. VOIR uses queries to retrieve sets of documents that are related to the passage containing the selected anchor. VOIR does not show the user links that have pre-established relationships. Rather, to submit a query and to establish a relationship, the user has to pause and select an anchor. VOIR was designed specifically to support interactive information exploration, rather than to facilitate the reading process. Thus, VOIR's focus is supporting navigation between documents. The user is thus expected to devote much cognitive effort to browsing. Furthermore, VOIR does not permit the user to annotate or tag documents. VOIR also does not indicate which link was selected to generate a particular display.

A background information retrieval process called the Remembrance Agent (hereinafter RA) is described in "A Continuously Running Automated Information Retrieval System", B. J. Rhodes et al. *Proceedings of The First International Conference on the Practical Application of Intelligent Agents in Multi-Agent Technology*, PAAM '96, April, 1997reference in its entirety. RA operates in an EMACS text window and suggests documents related to the last few lines of text typed by the user. RA is designed to search through a user's private data to suggest documents related to the text being typed. However, these suggestions are ephemeral and relate only to text that is currently being written. RA does not support reading tasks because it continuously replaces suggestions as the user edits the document.

QRL is a query-based information exploration interface that uses ink-like marks on text to specify boolean queries. This system is described in "Queries-R-Links: Graphical Markup for Text Navigation", by G. Golovchinsky et al., *Proceedings of INTERCHI '93*, April 1993, Amsterdam, The Netherlands, ACM Press, incorporated herein by reference in its entirety. Query terms are selected with rectangles. Lines connect the rectangles to represent boolean AND operators.

All of these systems require extensive user interaction to generate links to related documents or only support writing. An electronic document reading system is needed that passively and unobtrusively generates links to related documents to support reading.

SUMMARY OF THE INVENTION

This invention provides a method and a system for passively showing the reader related documents without interfering with the reading process.

The invention further provides intuitive support for reading by automatically detecting portions of other documents or other portions of the same document that are potentially of interest to the reader based on the reader's interaction with the portion of the source document being read. When people read text, they often make annotations to highlight interesting or controversial passages and terms. The presence or relative density of such marks and scribbles may be used as an indicator of the relative interest that the reader has in a particular passage. When a large body of documents related to the document being read is available, the reader may be interested in finding related portions of other documents or other portions of the same document as part of the reading process.

References to portions of other documents or to other portions of the same document that are related to specific passages of interest to the user are placed in the source document's margins and references to other documents that are similar overall to the source document are inserted as end notes. The system and method of this invention maintain the links once they have been identified to facilitate non-linear reading and skimming.

The system and method of this invention infer a user's interests from annotations that are made to a source document by the user while the user is reading the source document. Therefore, the system and method of this invention minimize cognitive overhead in at least two ways: 1) no explicit query is required to identify portions of other documents and other portions of the same document that are related to the portion of the source document that has been annotated by the user; and 2) selectable links to the portions of other related documents or other portions of the same document are provided unobtrusively in the margins and at the end of the source document. An example of this is shown in FIGS. 2 and 3, respectively.

The system and method of this invention also introduce suggestions to the reader in a manner that is compatible with other interactions, rather than burdening the user with modal dialogues. Portions of other documents or other portions of the same document that are suggested by the method and system of this invention are accessible by following selectable links. However, the system and method of this invention does not force the user to act on a suggestion when it is made. Rather, the user can act on the suggestion when (or if) it makes sense to the user to do so. The system and method of this invention represent the type of the suggested or referenced portion with an icon and provide a textual label to the icon to give users a better understanding of the target of the link.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 2 shows a source document having an icon in the margin adjacent to an annotated passage;

FIG. 3 shows another source document having an endnote; and

DETAILED DESCRIPTION OF PREFERRED EMBODIMENTS

Figure 1:
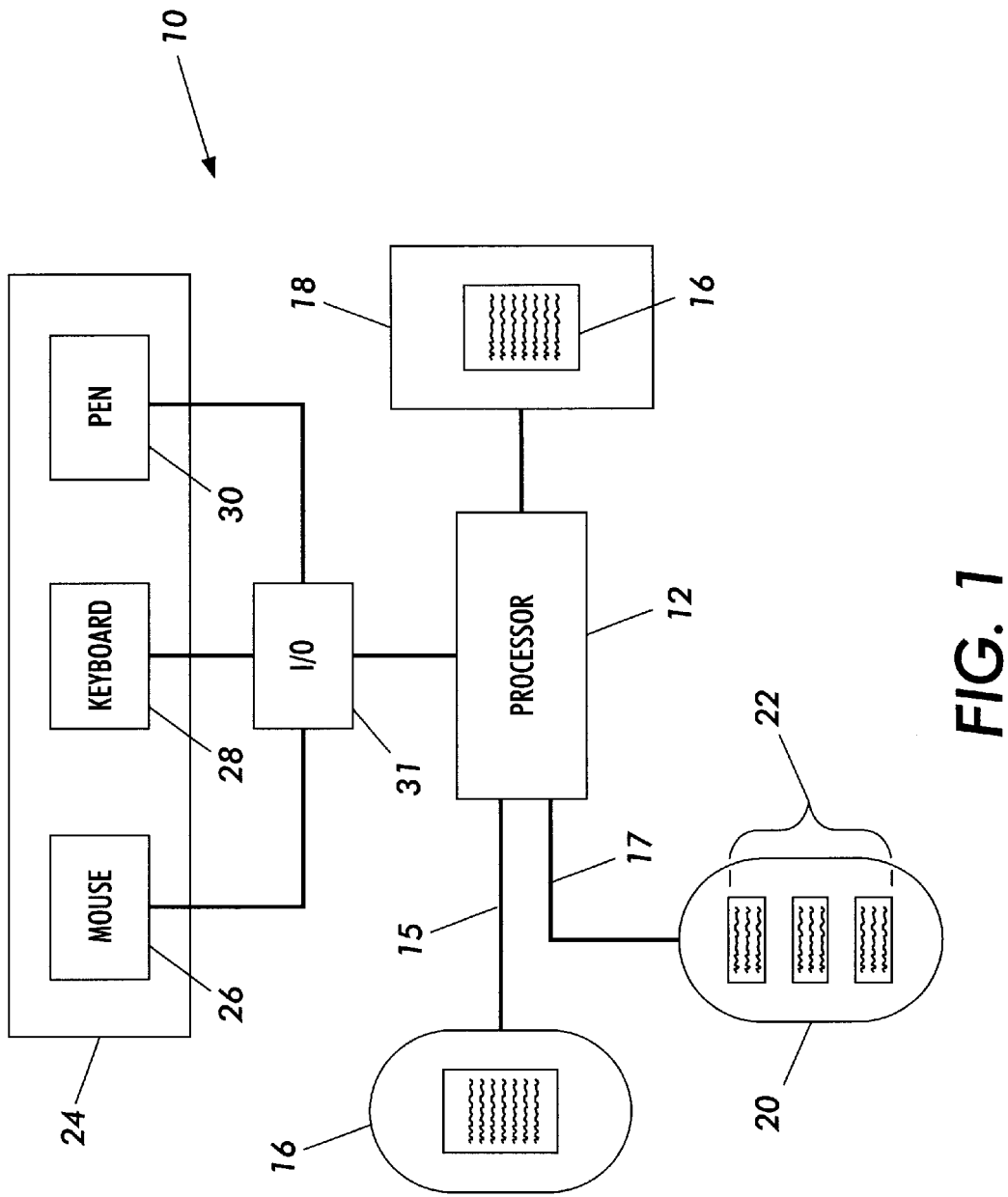
FIG. 1 is a block diagram of one embodiment of the electronic document reading system of this invention.

FIG. 1 shows a block diagram of one embodiment of a document reading system 10 according to this invention. The document reading system 10 includes a processor 12 communicating with a first memory 14 that stores a source document 16 that is currently being read by a user on a display 18. The processor 12 also communicates with a second memory 20 that stores potentially related target portions 22. The target portions may, optionally, include portions of the source document 16. The target portions 22 may include whole or entire documents.

A user interacts and controls the document reading system 10 through any number of conventional input/output devices 24, such as a mouse 26, a keyboard 28, or a pen-based interface 30. The input/output devices 24 communicate with an input/output interface 31 that, in turn, communicates with the processor 12.

As shown in FIG. 1, the system 10 is preferably implemented on a programmed general purpose computer. However, the system 10 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowchart shown in FIGS. 4A and 4B can be used to implement the system 10.

Additionally, as shown in FIG. 1, the storage devices or memories 14 and 20 are preferably implemented using static or dynamic RAM. However, the devices 14 and 20 can also be implemented using a floppy disk and disk drive, a writable optical disk and disk drive, a hard drive, flash memory or the like. Also, it should be appreciated that the devices 14 and 20 can be either distinct portions of a single memory or physically distinct memories.

Further, it should be appreciated that the links 15 and 17 connecting the devices 14 and 20 and the processor 12 can be a wired or wireless link to a network (not shown). The network can be a local area network, a wide area network, an intranet, the Internet or any other distributed processing and storage network. In this case, the electronic document 16 is pulled from the physically remote memory device 14 through link 15 for processing in the processor 12 and the target portions 22 are remotely accessed through the link 17 according to the method outlined below. In this case, the electronic document 16 and the target portions 22 can also be stored locally in a portion of some other memory device of the system 10 (not shown).

The method of this invention identifies two kinds of target portions related to a passage of each source document 16. The two types are: 1) target portions 22 that are related to specific annotated passages of the source document; and 2) target portions 22 that are related to the overall source document. Once a relationship is established between a passage of the source document and the target portions 22, the target portions 22 may be displayed by clicking on selectable links in the display of the source document 16. The system and method of this invention may optionally show in a single display all target portions 22 that have been identified as being related to one or more passages in the source document 16.

Examples of references to the two types of target portions 22 are shown in FIGS. 2 and 3. A target portion 22 related to a specific passage 32 in the source document 16 is identified by a margin representation 34 placed in the margin of the source document 16 near the related passage 32. As shown in FIG. 3, a target portion 22 that is related to the source document 16 as a whole is annotated and shown as an end-note 36 to the source document. The end note 36 may include the type, the title and the summary information of the document from which the target portion originated.

This invention is not to be limited by the type of annotation or the method or system that determines the context of an annotation. Annotations may be structured or unstructured.

Figure 4A:
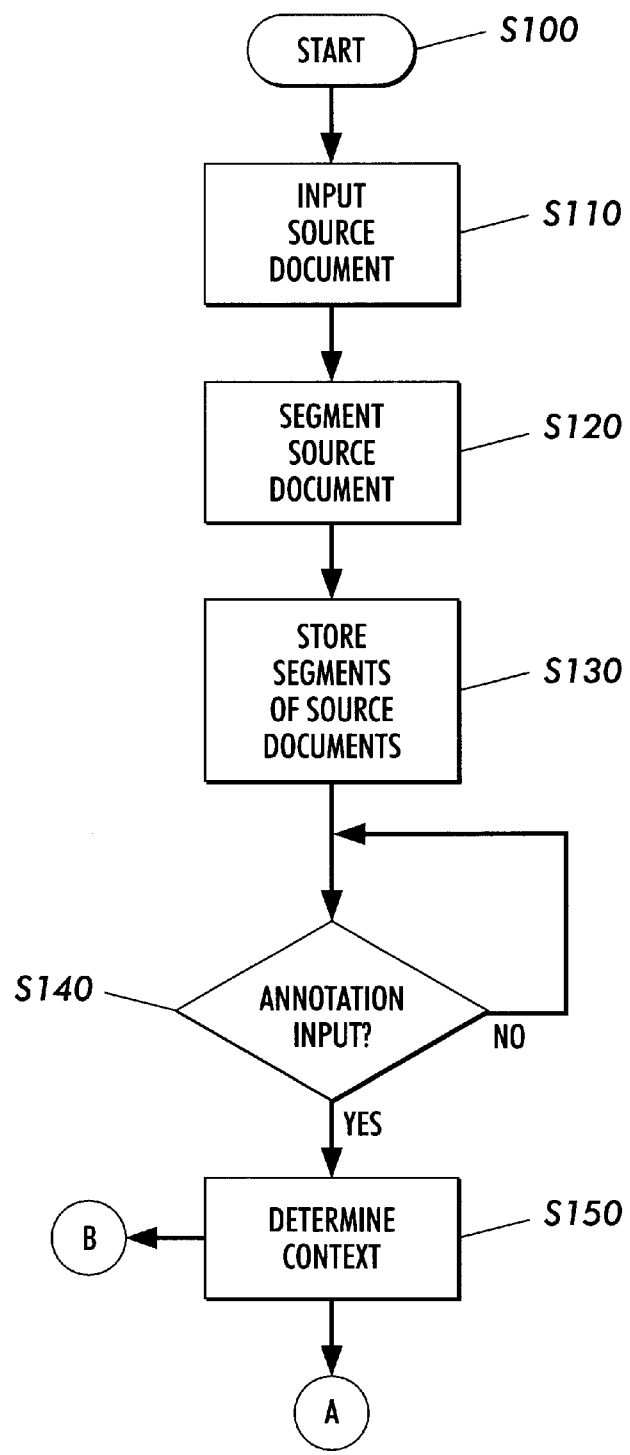
FIGS. 4A and 4B show a flowchart outlining a control routine for one embodiment of this invention.
Figure 4B:
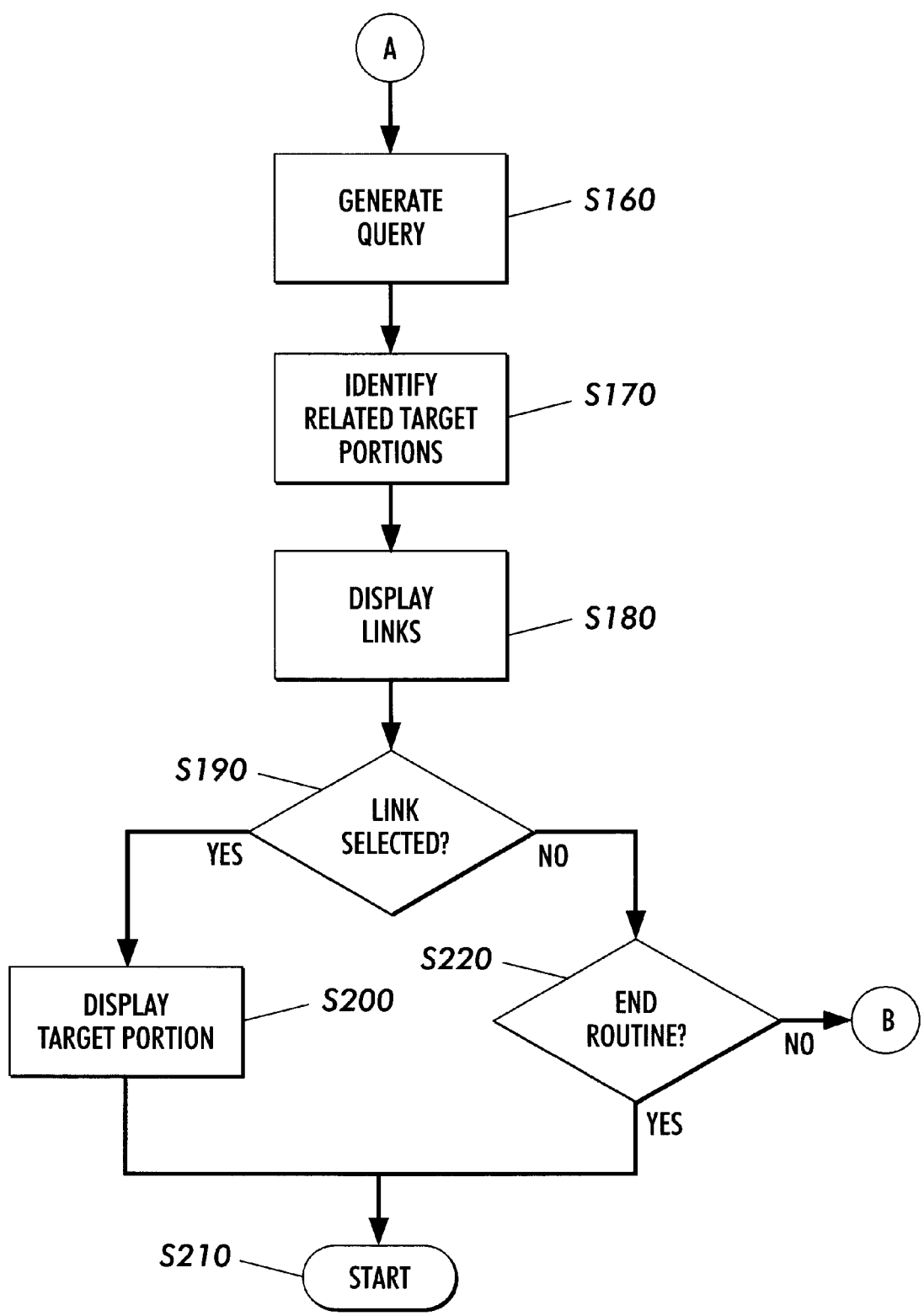

FIGS. 4A and 4B show a flowchart outlining the control routine for one embodiment of the method of this invention. The control routine starts at step S100 and continues to step S110. In step S110, the control routine receives a source document 16 as input and continues to step S120. In step S120, the control routine segments the source document into a series of passages and the control routine continues to step S130. The segmentation in step S120 may be performed by any conventional segmentation system or method. In step S130, the control routine stores the segments of the source document as additional target portions 22 and continues to step S140. In this manner, the segmented passages of the source document are made available as potential related portions to be referenced.

In step S140, the control routine determines whether an annotation has been input into the system. The annotation may be input in any number of different ways using any number of different systems. One preferred method of inputing an annotation is by marking directly on a display of the source document using a stylus in a pen-based input device. In step S140, if the control routine determines that an annotation has not been input into the system, the control routine returns to step S140. If the control routine determines in step S140 that an annotation has been input then the control routine continues to step S150.

In step S150, the control routine determines the context for the annotation. The context may be determined in step S150 by any conventional system and method. Preferably, the context of an annotation is determined using bounding boxes. The system generates a bounding box around the annotation mark and expands the bounds of the box to define the context. The horizontal bounds are extended horizontally to the edge of the text and the vertical bounds are extended vertically to include complete words, sentences or paragraphs. The amount of text bounded by the bounding box is initially established using predetermined preferences which way be adjusted to suit the user. Additionally, the user may directly manipulate the bounding box to determine the context of an annotation. After the control routine determines the context of the annotation in step S150, the control routine continues to step S160.

In step S160, the control routine analyzes the context of the annotation and generates a query that will be used to search the database of target portions 22. The system and method of this invention derives the query from the text of the annotated passage and from the nature of the annotation. The control routine then continues to step S170 where the query is used to identify related target portions 22. The related target portions 22 are identified using the query generated in step S160 by determining the best-matching target portion and which exceeds a predetermined threshold. Any number of conventional methods or systems may be used to determine the best matching target portion and it is to be understood that this invention is not limited to any particular searching method or system. Additionally, the predetermined threshold may be adjusted by the user in accordance with the user's preferences.

The control routine then continues to step S180 where links to each of the identified target portions are displayed.

If the link corresponds to a target portion that is related to the context of a particular annotation then the link is displayed in a margin adjacent to the annotation as a margin representation 34 as shown in FIG. 2. Alternatively, if the control routine identifies a target portion in step S170 that is related to the source document as a whole then the control routine displays a link to the target portion as an end note 36 as shown in FIG. 3. The control routine then continues to step S190.

In step S190, the control routine determines if a user has selected a link that has been displayed. If in step S190, the control routine determines that a link has been selected, then the control routine continues to step S200. In step S200, the control routine displays the target portion that corresponds to the selected link. The control routine then continues to step S210 where the control routine stops.

In an alternative embodiment, which is not shown, the control routine may process the displayed target portion as the input source document and return to step S110 where the target portion is processed. In another embodiment, if, in step S190, the link is selected then the entire document from which the identified target portion related to the selected link is displayed and the entire document from which the target portion originated may be input as a source document in step S110. However, if in step S190, a link is not selected then the control routine continues to step S220.

In step S220, the control routine determines if the user has input an end routine command. If in step S220 the user has not input a end routine command the control routine returns to step S140. Alternatively, if in step S220, the control routine determines that the user has input an end routine command, the control routine continues to step S210 where the control routine stops.

The control routine of the method and system of this invention may be set to operate when the document reading system 10 is turned on or upon the receipt of a user input command (such as an annotation).

Additionally, the number of target portions that are identified and/or displayed may be adjustable using a predetermined threshold. This threshold can prevent the display of too many links that may obscure or prevent the system from being useful. For example, the system may identify a plurality of target portions based upon their relatedness to the source document, clusters the identified plurality of target portions and selects at least one of the plurality of identified target portions for each cluster that typifies all of the identified target portions within each respective cluster, wherein the selectable link references the selected at least one of the plurality of second portions.

Target portions may be identified using any one or more of conventional methods. For example, the relatedness of a target portion may be determined using a text-based statistical similarity method or may use a full-text boolean or probabilistic method. Other examples include linguistic or logical analysis methods, speaker identification or recognition and image similarity algorithms. The invention is not limited to any now known or future method or system for determining the relatedness of the target portions to the source document.

The method and system of this invention use a passage or portion of a document rather than the entire document as the unit of retrieval. The target portions 22 are indexed by segmenting documents into tiles that contain spans of statistically similar text. The tiles are used as the unit of retrieval rather than documents because long documents that address many topics tend to match queries poorly, whereas specific portions of those documents may match quite well.

The method and system of this invention recognize several distinct ink patterns from which queries are computed. The ink patterns or marks include underlined words, circled words, circled passages and marginal annotations. Preferably, each type of annotation results in a different query for the search engine. For example, marks that select specific words translate into queries that emphasize those words over others in the same sentence and marks that select longer passages generate queries that search for similar phrases. Alternatively, a separate query may be computed for each stroke.

Ink strokes may also be grouped by time and type of annotation. For instance, annotation types may be distinguished by color and annotations having an identical or similar color may be grouped to generate a query.

It is to be understood that the term annotation as used herein is intended to include text, digital ink, audio, video or any other input associated with a document. It is also to be understood that the term document is intended to include text, video, audio and any other media and any combination of media. Further, it is to be understood that the term text is intended to include text, digital ink in stroke or bitmap format, audio, images, video or any other structure or content of a document. It is also intended to be understood that the term "annotation" is intended to include text, digital ink, audio, images, video or any other input associated with a document.

It is to be understood that the term "similarity" or "relatedness" is intended to include any measure of a document or portion of a document's relatedness or relevance to a portion of another document or portion of a document to include other portions of the same document.

While this invention has been described with the specific embodiments outlined above, many alternatives, modifications and variations are and will be apparent to those skilled in the art. Accordingly, the preferred embodiments described above are illustrative and not limiting. Various changes may be made without departing from the spirit and scope of the invention.

What is claimed is:

1. A method for identifying, for a source document, at least one link to a target portion, each target portion being related to the source document, based on at least one reader annotated passage and where a reader annotated passage includes dynamically highlighting passages, terms, and adding text, the method comprising:

identifying at least one reader annotated passage of the source document;

in response to said identifying at least one reader annotated passage identifying at least one target portion that is related to the at least one reader annotated passage of the source document; and displaying in a display of the source document a selectable link for each identified target portion.

2. The method of claim 1, wherein the selectable link is displayed as an end note to the source document.

3. The method of claim 1, wherein the selectable link is displayed near the identified at least one reader annotated passage.

4. The method of claim 3, wherein the step of identifying at least one target portion is in response to the reader annotation of the at least one passage of the source document.

5. The method of claim 4, wherein the step of identifying the at least one target portion is in response to the reader annotation of the at least one annotated passage of the source document.

6. The method of claim 4, wherein the selectable link is displayed in the margin of the display of the source document adjacent to the at least one reader annotated passage.

7. The method of claim 1, wherein an icon representing the type of the identified at least one target portion is displayed.

8. The method of claim 1, wherein the title of the document from which the identified at least one target portion originated is displayed.

9. The method of claim 1, wherein a summary of the documents from which the identified at least one target portion originated is displayed.

10. The method of claim 1, wherein the step of identifying at least one reader annotated passage comprises segmenting the source document into passages and identifying at least one of the passages as having an annotation.

11. The method of claim 1, wherein the step of identifying the at least one target portion comprises determining the relatedness based upon reader identified terms and terms identified using relevance feedback techniques.

12. The method of claim 11, wherein the step of identifying uses weighted-sum queries.

13. The method of claim 12, wherein the step of identifying further comprises identifying at least one target portion that is above a predetermined similarity threshold.

14. The method of claim 1, further comprising the steps of:

determining if the selectable link has been selected; and displaying the identified at least one target portion in response to the selection of the selectable link.

15. The method of claim 1, wherein the step of identifying comprises the steps of:

identifying a plurality of target portions as related to the source document;

clustering the identified plurality of target portions; and selecting at least one of the identified plurality of target portions for each cluster that typifies all of the identified plurality of target portions documents within each respective cluster, wherein the selectable link references the selected at least one of the identified plurality of target portions.

16. The method of claim 1, wherein the relatedness is determined based upon the similarity of the at least one target portion to the source document.

17. An electronic document system for suggesting in a display of a source document at lest one target portion that is related to the source document, based on at least one reader annotated passage and where a reader annotated passage comprises dynamically highlighting a passage, terms, adding text, the system comprising: a processor that identifies at least one reader annotated passage of the source document and that identifies at least one target portion as related to the reader annotated passage of the source document; in response to said processor identifying at least one reader annotated passage of the source document and a display that displays a selectable link that references the identified at least one target portion in a display of the source document.

18. The system of claim 17, wherein the processor identifies the at least one target portion based upon the relatedness of the at least one target portion to the source document, and wherein the selectable link references the identified at least one target portion.

19. The system of claim 18, wherein the processor identifies at least one reader annotated passage of the source document and identifies the at least one target portion as related to the identified at least one reader annotated passage, wherein the selectable link is displayed near the identified at least one reader annotated segment.

20. The system of claim 17, wherein the selectable link is displayed as an end note to the source document.

21. The system of claim 17, wherein the selectable link is displayed in the margin adjacent to the at least one reader annotated passage.

22. The system of claim 17, further comprising a user interface, wherein the display is responsive to the selection of the selectable link by the user to display the identified at least one target portion.

23. The system of claim 17, wherein the processor identifies a plurality of target portions based upon their relatedness to the source document, clusters the identified plurality of target portions and selects at least one of the plurality of identified target portions for each cluster that typifies all of the identified target portions within each respective cluster, wherein the selectable link references the selected at least one of the plurality of second portions.

24. The system of claim 17, wherein the display also displays an icon representing the type of the identified at least one target portion.

25. The system of claim 17, wherein the display also displays the title of the document from which the identified at least one target portion originated.

26. The system of claim 17, wherein the display also displays a summary of the document from which the identified at least one target portion originated.

27. The system of claim 17, further comprising a user input interface, wherein the processor is responsive to the annotation of a passage of the source document by the reader to identify the at least one target portion.

28. The system of claim 17, wherein the processor identifies the at least one target portion based upon reader identified terms and terms identified based upon relevance feedback techniques.

29. The system of claim 28, wherein the processor also identifies the at least one target document based upon weighted-sum queries.

30. The system of claim 17, wherein the processor determines the relatedness of the at least one target portion to the source document based upon the similarity of the context of the target portion to the source document.

31. The system of claim 30, wherein the processor identifies the at least one of the plurality of target portions as being above a predetermined similarity threshold.

* * * * *